United States Patent
Minter et al.

(10) Patent No.: US 8,452,227 B2
(45) Date of Patent: May 28, 2013

(54) METHODS AND SYSTEMS FOR SELECTING INTERNET RADIO PROGRAM BREAK CONTENT USING MOBILE DEVICE LOCATION

(76) Inventors: David D. Minter, Littleton, CO (US); Albert S. Baldocchi, Boulder, CO (US)

( * ) Notice: Subject to any disclaimer, the term of this patent is extended or adjusted under 35 U.S.C. 154(b) by 388 days.

(21) Appl. No.: 12/384,193

(22) Filed: Apr. 1, 2009

(65) Prior Publication Data

US 2010/0112935 A1  May 6, 2010

Related U.S. Application Data

(60) Provisional application No. 61/110,372, filed on Oct. 31, 2008.

(51) Int. Cl.
*H04H 20/71* (2008.01)

(52) U.S. Cl.
USPC .......................................................... 455/3.03

(58) Field of Classification Search
USPC .................................... 455/3.01–3.06, 456.3
See application file for complete search history.

(56) References Cited

U.S. PATENT DOCUMENTS

| | | | |
|---|---|---|---|
| 6,353,797 B1 | 3/2002 | Heideman | 701/207 |
| 6,545,596 B1 | 4/2003 | Moon | 340/425.5 |
| 6,546,257 B1 | 4/2003 | Stewart | 455/456.3 |
| 6,552,682 B1 | 4/2003 | Fan | 342/357.09 |
| 6,577,716 B1 | 6/2003 | Minter et al. | 379/101.01 |
| 6,628,928 B1 | 9/2003 | Crosby et al. | 455/77 |
| 6,629,136 B1 | 9/2003 | Naidoo | 709/219 |
| 6,799,201 B1 | 9/2004 | Lee et al. | 709/217 |
| 6,985,588 B1 | 1/2006 | Glick et al. | 380/258 |
| 6,993,326 B2 | 1/2006 | Link, II et al. | 455/414.1 |
| 7,089,264 B1 | 8/2006 | Guido et al. | 707/104.1 |
| 7,149,541 B2 | 12/2006 | Rautila | 455/552.1 |
| 7,343,141 B2 * | 3/2008 | Ellis et al. | 455/132 |
| 7,343,157 B1 | 3/2008 | Mitchell | 455/431 |
| 7,363,001 B2 | 4/2008 | Steelberg et al. | 455/3.06 |
| 7,376,414 B2 | 5/2008 | Engstrom | 455/414.3 |
| 7,376,640 B1 | 5/2008 | Anderson et al. | 707/3 |
| 7,385,501 B2 | 6/2008 | Miller et al. | 340/539.13 |
| 7,409,221 B2 | 8/2008 | Obradovich et al. | 455/457 |
| 7,720,432 B1 | 5/2010 | Colby et al. | |

(Continued)

FOREIGN PATENT DOCUMENTS

WO  WO01/08413  2/2001

OTHER PUBLICATIONS

ANSI/SCTE Std. 35 "Digital Program Insertion Cueing Message for Cable," (2007) <http://www.scte.org/documents/pdf/ANSI_SCTE%2035%202007%20Digital%20Program%20Insertion%20Cueing%20Message%20for%20Cable.pdf>, 42 pages.

(Continued)

*Primary Examiner* — Jeffrey Zweizig
(74) *Attorney, Agent, or Firm* — Scot A. Reader

(57) ABSTRACT

Methods and systems for selecting content for outputting on a mobile device during a program break in an Internet radio stream using mobile device location information. In one aspect, the methods and systems seamlessly select content for outputting on a mobile device during a program break in an Internet radio stream using mobile device location information and program break markers. In another aspect, the methods and systems select content for outputting on a mobile device during a program break in an Internet radio stream using mobile device trajectory information.

28 Claims, 6 Drawing Sheets

U.S. PATENT DOCUMENTS

| | | | |
|---|---|---|---|
| 2002/0035605 A1 | 3/2002 | McDowell et al. | 709/206 |
| 2002/0055924 A1 | 5/2002 | Liming | 707/100 |
| 2004/0103032 A1 | 5/2004 | Maggio | 705/14 |
| 2004/0176999 A1* | 9/2004 | Estese et al. | 705/14 |
| 2005/0020223 A1* | 1/2005 | Ellis et al. | 455/186.1 |
| 2006/0074769 A1 | 4/2006 | Looney | 705/26 |
| 2007/0005795 A1 | 1/2007 | Gonzalez | 709/232 |
| 2007/0091206 A1 | 4/2007 | Bloebaum | 348/460 |
| 2007/0162927 A1 | 7/2007 | Ramaswamy et al. | 725/36 |
| 2007/0244750 A1 | 10/2007 | Grannan et al. | 705/14 |
| 2007/0276926 A1 | 11/2007 | LaJoie et al. | 709/219 |
| 2008/0015933 A1 | 1/2008 | McKenna et al. | |
| 2008/0051070 A1 | 2/2008 | Dharmaji | 455/414.1 |
| 2008/0052741 A1 | 2/2008 | Dharmaji | 725/32 |
| 2008/0248815 A1 | 10/2008 | Busch | 455/456.5 |
| 2008/0254741 A1* | 10/2008 | Irvin | 455/3.03 |
| 2008/0270235 A1 | 10/2008 | Yoon et al. | 705/14 |
| 2008/0276268 A1 | 11/2008 | Harpak et al. | 725/32 |
| 2008/0307481 A1 | 12/2008 | Panje | 725/119 |
| 2009/0019061 A1 | 1/2009 | Scannell | 707/10 |
| 2009/0076906 A1* | 3/2009 | Kansal et al. | 705/14 |
| 2010/0293049 A1 | 11/2010 | Maher et al. | |
| 2010/0306318 A1 | 12/2010 | Fitzpatrick et al. | |

OTHER PUBLICATIONS

ANSI/SCTE Std. 130-1 "Digital Program Insertion—Advertising Systems Interfaces Part 1—Advertising Systems Overview (Informative)," (2008) <http://www.scte.org/documents/pdf/Standards/ANSI_SCTE%20130-1%202008.pdf>, 16 pages.

A. Dutta, "A Streaming Architecture for Next Generation Internet," (2001) < http://www1.cs.columbia.edu/~dutta/research/icc2001-ngi.pdf >, 7 pages.

* cited by examiner

METHODS AND SYSTEMS FOR SELECTING INTERNET RADIO PROGRAM BREAK CONTENT USING MOBILE DEVICE LOCATION

CROSS-REFERENCE TO RELATED APPLICATION(S)

This application claims the benefit of U.S. provisional application No. 61/110,372 entitled "Location-Based Narrow-Casting of Content to a Mobile Device," filed on Oct. 31, 2008, which is incorporated herein by reference.

BACKGROUND OF INVENTION

The present invention relates to location-based services and, more specifically, methods and systems for selecting content for outputting on a mobile device during a program break in an Internet radio stream using mobile device location information.

Many radio stations deliver audio programming via the Internet. Some Internet radio streams are simulcasts of radio broadcasts transmitted by conventional over-the-air radio stations. Other Internet radio streams originate from Internet-only sources.

Internet radio streams are sometimes comprised of audio programs of specified durations. For example, an Internet radio stream may have a half-hour news program followed by a two-hour talk show program followed by a four-hour music program. Each of these audio programs will normally include program breaks during which audio content that is distinct from the program content is delivered. For example, a talk show program may be interrupted by program breaks during which advertisements and news reports (e.g. traffic, weather, stock market, politics, sports, etc.) are outputted.

The audio content outputted during Internet radio program breaks is often outputted to all listeners without regard to where they are listening. This audio content may be of limited value to many listeners, advertisers and broadcasters because it addresses topics that are not sufficiently local or otherwise relevant to these entities. Moreover, such indiscriminate outputting limits the pool of businesses that can afford to purchase Internet radio ad spots. For example, many neighborhood businesses that market to a local customer base cannot afford to pay for an advertisement outputted to the entire listenership of an Internet radio program.

To address the foregoing concerns, it has been proposed to select audio content for outputting on mobile devices during Internet radio program breaks based on the location of the mobile devices. However, these proposals have not provided meaningful guidance on how to perform the real-time content selection using mobile device location information required for seamless Internet radio. Moreover, these proposals have neglected other value-added approaches, such as selecting audio content based on a mobile device's trajectory as opposed to its mere location.

SUMMARY OF THE INVENTION

In one aspect, the present invention seamlessly selects content for outputting on a mobile device during a program break in an Internet radio stream using mobile device location information and program break markers. Using mobile device location information to select program break content facilitates selection of program break content that addresses topics highly relevant to the listener, advertiser and broadcaster and thus often of greater value to one or more of these entities. Using program break markers facilitates the real-time content selection required for seamless Internet radio. In another aspect, the present invention selects content for outputting on a mobile device during a program break in an Internet radio stream using mobile device trajectory information. Using mobile device trajectory information to select program break content facilitates selection of program break content that addresses topics relating to where a mobile device user is headed, which may be of even greater value to the listener, advertiser and broadcaster.

In some embodiments of the invention, an Internet radio source selects program break content using location information reported by a mobile device. In some of these embodiments, an Internet radio source comprises a communication interface, a memory and a processor communicatively coupled with the communication interface and the memory, wherein the Internet radio source receives via the communication interface location information associated with a mobile device receiving an Internet radio stream and under control of the processor in response to detecting a marker in the Internet radio stream indicating a start of a program break selects content for outputting on the mobile device during the program break based at least in part on the location information.

In some of these embodiments, under control of the processor the Internet radio source inserts the content into the Internet radio stream during the program break and delivers the content to the mobile device via the communication interface.

In some of these embodiments, under control of the processor the Internet radio source selects the content based at least in part on conformance of the content with the location information and duration of the program break.

In some of these embodiments, the marker indicates the duration of the program break.

In some of these embodiments, under control of the processor the Internet radio source selects the content based at least in part on a determination of compatibility of the content with the mobile device.

In some of these embodiments, the Internet radio source under control of the processor determines a trajectory of the mobile device based at least in part on the location information and selects content for outputting on the mobile device during the program break based at least in part on the trajectory.

In some of these embodiments, the content comprises audio content.

In some of these embodiments, the content comprises print content.

In some of these embodiments, the content comprises audio content and related print content.

In some of these embodiments, the location information has a degree of accuracy selected by a user of the mobile device.

In some of these embodiments, the location information is received from the mobile device in response to a request transmitted by the Internet radio source.

In some of these embodiments, the location information is received from the mobile device independent of any request transmitted by the Internet radio source.

In some of these embodiments, the location information comprises global positioning system (GPS) coordinates.

In some of these embodiments, the content comprises an advertisement.

In some of these embodiments, the content comprises a news report.

In other of these embodiments, a method for selecting content for outputting on a mobile device receiving an Internet radio stream during a program break in the Internet radio stream comprises the steps of receiving location information associated with the mobile device, detecting a marker in the Internet radio stream indicating a start of the program break and selecting content for outputting on the mobile device during the program break based at least in part on the location information.

In other embodiments of the invention, a mobile device selects program break content using location information generated on the mobile device. In some of these embodiments, a mobile device comprises a location interface, a communication interface, a memory and a processor communicatively coupled with the location interface, the communication interface and the memory, wherein the mobile device receives via the location interface location information associated with the mobile device and receives via the communication interface an Internet radio stream and under control of the processor in response to detecting a marker in the Internet radio stream indicating a start of a program break selects content for outputting on the mobile device during the program break based at least in part on the location information.

In some of these embodiments, the mobile device under control of the processor inserts the content into the Internet radio stream during the program break and outputs the content on the mobile device via at least one audio output interface.

In some of these embodiments, the mobile device receives via the communication interface a plurality of content candidates associated with respective location information and selects the content from among the content candidates.

In some of these embodiments, the mobile device under control of the processor determines a trajectory of the mobile device based at least in part on the location information and selects content for outputting on the mobile device during the program break based at least in part on the trajectory.

In still other embodiments, an Internet radio source selects program break content using trajectory information determined from location information reported by a mobile device. In some of these embodiments, an Internet radio source comprises a communication interface, a memory and a processor communicatively coupled with the communication interface and the memory, wherein the Internet radio source receives via the communication interface location information associated with a mobile device receiving an Internet radio stream and under control of the processor selects content for outputting on the mobile device during a program break in the Internet radio stream based at least in part on trajectory information determined using the location information.

In some of these embodiments, the Internet radio source selects the content based at least in part on an estimated time of arrival determined using the trajectory information.

In still other embodiments, a method for selecting content for outputting on a mobile device receiving an Internet radio stream during a program break in the Internet radio stream comprises the steps of receiving location information associated with the mobile device and selecting content for outputting on the mobile device during the program break based at least in part on trajectory information determined using the location information.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
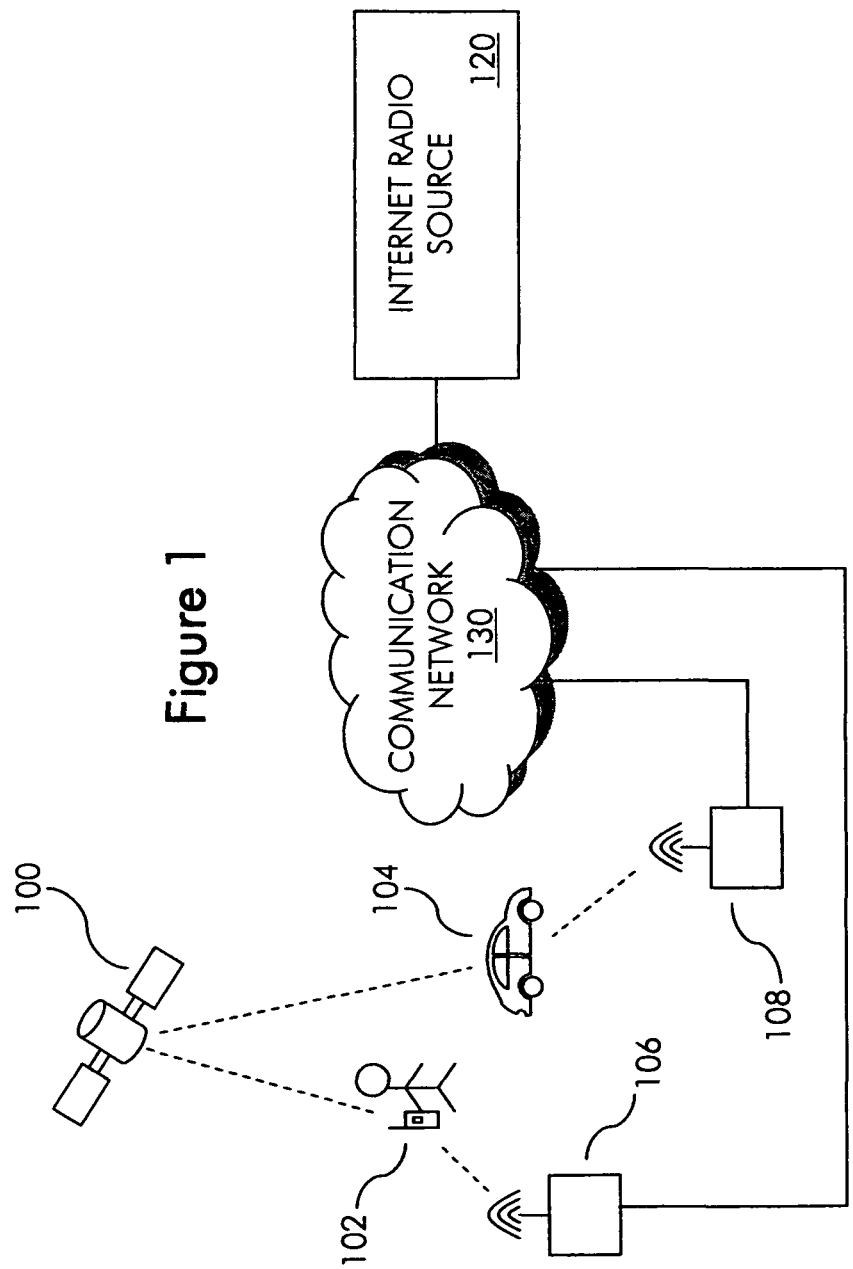
FIG. 1 shows a communication system in some embodiments of the invention.

FIG. 1 shows a communication system in which the invention is operative in some embodiments. The communication system includes mobile devices 102, 104 that are communicatively coupled with Internet access devices 106, 108, respectively, via wireless links. Mobile devices 102, 104 are shown to include a mobile phone 102 and a passenger vehicle 104 having an Internet radio, although mobile devices operative with the invention may include various other types of mobile devices that are capable of determining their location and outputting an Internet radio stream, such as portable computers, personal data assistants (PDAs) and mobile Internet appliances. Internet access devices 106, 108 are installed at different geographic locations and may be any of various types of devices capable of supporting mobile wireless Internet access, such as WiMAX, EDGE or 3G base stations or Wi-Fi access points, to name a few. Internet access devices 106, 108 are communicatively coupled with an Internet radio source 120 over a communication network 130, which may have any number of nodes, such as routers, switches, and bridges, via a wired or wireless connection. Internet radio source 120 delivers to mobile devices 102, 104 an Internet radio stream that may be a simulcast of an over-the-air radio broadcast or an Internet-only radio stream. The communication system also includes a constellation of GPS satellites 100 transmitting GPS signals that mobile devices 102, 104 receive and interpret to resolve their respective locations.

In other embodiments, a mobile device may acquire its location from a source other than GPS, such as a different satellite navigation system or a terrestrial source. Location acquisition from a terrestrial source may be accomplished through, for example, base station triangulation, manual input of a location by a mobile device user or advertisement of a static location by an Internet access device to which the mobile device is linked wirelessly.

Figure 2:
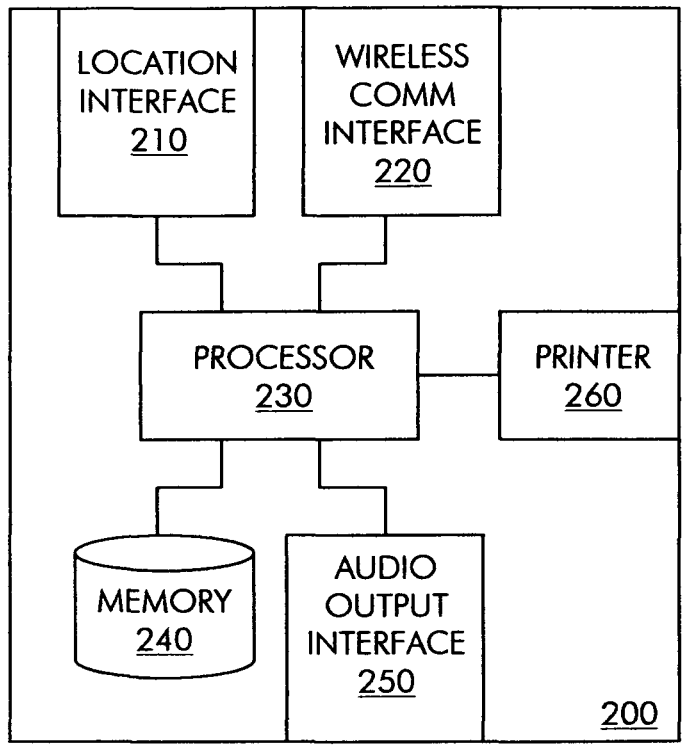
FIG. 2 shows a mobile device in some embodiments of the invention.

Turning to FIG. 2, a mobile device 200, which is representative of mobile devices 102, 104, is shown in some embodiments to include a location interface 210, a wireless communication interface 220, a memory 240, an audio output interface 250 and a printer 260, all of which are communicatively coupled with a processor 230. Location interface 210 receives GPS signals from GPS satellites 100 and posses GPS signals to processor 230. Wireless communication interface 220 provides connectivity between mobile device 200 and an Internet access device (e.g. 106, 108) via a wireless link, such as a WiMAX, EDGE, 3G or Wi-Fi link. Audio output interface 250 includes speakers or other devices that produce audio output for outputting audio content in an Internet radio stream to a user of mobile device 200. Printer 260 is a printing mechanism for outputting to a mobile device user print content that may be related to audio content in an Internet radio stream. Processor 230 executes in software operations supported by mobile device 200, including management of wireless links and Internet radio streaming sessions via wireless communication interface 220; generating and transmitting to Internet radio source 120 via wireless communication interface 220 location reports having GPS coordinates resolved from GPS signals and an identifier associated with mobile device 200, such as an IP address, media access control (MAC) address or session identifier; outputting audio content in an Internet radio stream via audio output interface 250; and outputting print content that may be related to audio content in an Internet radio stream via printer 260. Memory 240 stores software executable by processor 230, an identifier of mobile device 200 and resolved GPS coordinates. Memory 240 may include one or more random access memory (RAM) and/or one or more read only memory (ROM) elements.

Figure 3:
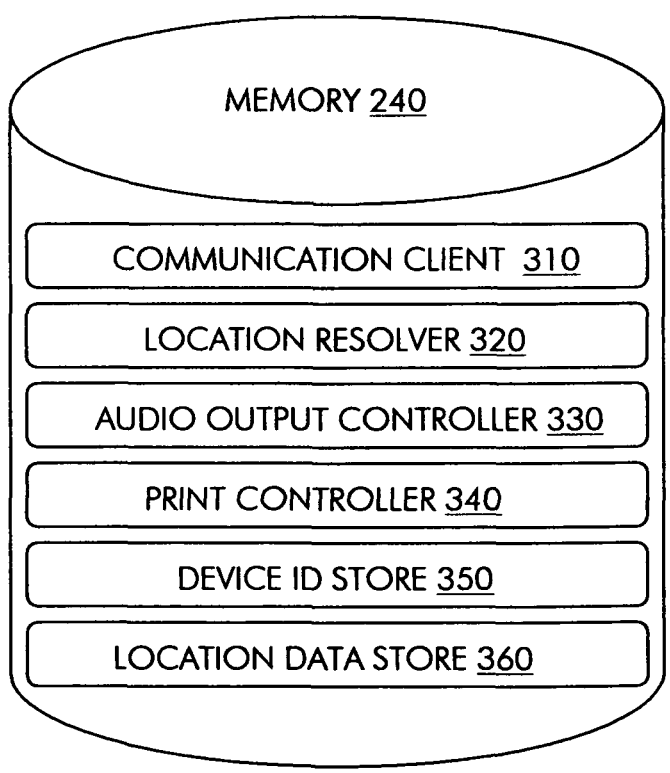
FIG. 3 shows operational elements of the mobile device of FIG. 2.

FIG. 3 shows operational elements of mobile device 200 stored in memory 240 to include a communication client 310, a location resolver 320, an audio output controller 330, a print controller 340, a device ID store 350 and a location data store 360. Communication client 310, location resolver 320, audio output controller 330 and print controller 340 are software programs executable by processor 230. Device ID store 350 and location data store 360 are data storage elements.

Communication client 310 generates and transmits location reports to Internet radio source 120 via wireless communication interface 220. Location reports may be generated and transmitted in response to location requests received from Internet radio source 120 via wireless communication interface 220, or independent of any request from Internet radio source 120. Location reports may be transmitted in response to an event, such as receipt of a location report or resolution of a new location, or may be transmitted periodically. Location reports include information retrieved from device ID store 350 sufficient to identify mobile device 200, such as an IP address, and location information retrieved from location data store 360, such as GPS coordinates including at least a latitude and longitude. Location information may be time-stomped with its time of acquisition. A location report may include only the most recently resolved instance of GPS coordinates, or may include the last N resolved instances GPS coordinates, wherein N is a greater than one. In the event valid GPS coordinates are unavailable at the time of reporting, such unavailability may be indicated in a location report by, for example, setting an invalid location flag or transmitting an invalid location symbol that will be recognized by Internet radio source 120. Moreover, to protect privacy, communication client 310 may provide a user with the ability to enable (opt-in) or disable (opt-out) provision of location information to Internet radio source 120, and may provide the user with the ability to select the degree of accuracy of location information provided to Internet radio source 120. For example, a user may prescribe that GPS coordinates included in a location report be accurate to within one kilometer.

Communication client 310 also translates audio content in an Internet radio stream received from Internet radio source 120 via wireless communication interface 220 into sound for outputting on audio output interface 250 under control of audio output controller 330. Communication client 310 additionally translates any print content related to such audio content into printer-ready data for outputting on printer 260 under control of print controller 340.

Location resolver 320 translates GPS signals received from location interface 210 into GPS coordinates having at least a latitude and longitude. Location resolver 320 stores the GPS coordinates in location data store 360, and may time-stamp the GPS coordinates with the acquisition time of the GPS coordinates. The time used to time-stamp GPS coordinates may be obtained from GPS satellites 100 or an internal clock, for example. In non-GPS embodiments, location resolver 320 may translate (if necessary), time-stamp and store location information received from an alternative satellite navigation system or terrestrial source.

Figure 4:
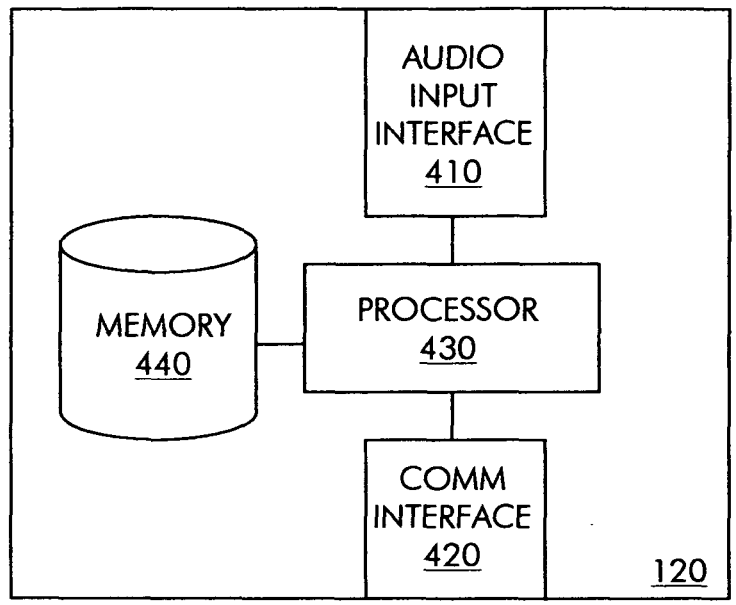
FIG. 4 shows an Internet radio source in some embodiments of the invention.

Turning to FIG. 4, Internet radio source 120 is shown in some embodiments of the invention to include an audio input interface 410, a communication interface 420 and a memory 440, all of which are communicatively coupled with a processor 430. Audio input interface 410 receives sound generated as part of an Internet radio program, or receives sound from an over-the-air terrestrial radio program, and passes the sound to processor 430. Communication interface 420 provides connectivity between Internet radio source 120 and communication network 130 via a wired or wireless connection, such as a high-bandwidth Ethernet connection, over which an Internet radio stream is delivered to mobile device 200. Processor 430 executes in software operations supported by Internet radio source 120, including management of wired connections and Internet radio streaming sessions via communication interface 420, processing location reports received from mobile device 200 via communication interface 420, translating sound received via audio input interface 410 as part of an Internet radio program into a streaming format, inserting selected content during program breaks in an Internet radio stream using GPS coordinates received in location reports, and delivering an Internet radio stream having selected program break content to mobile device 200 via communication interface 420. Memory 440 stores software executable by processor 430, information from location reports received from mobile device 200 and program break content selectable for insertion into an Internet radio stream. Memory 440 may have RAM and/or ROM elements.

Figure 5:
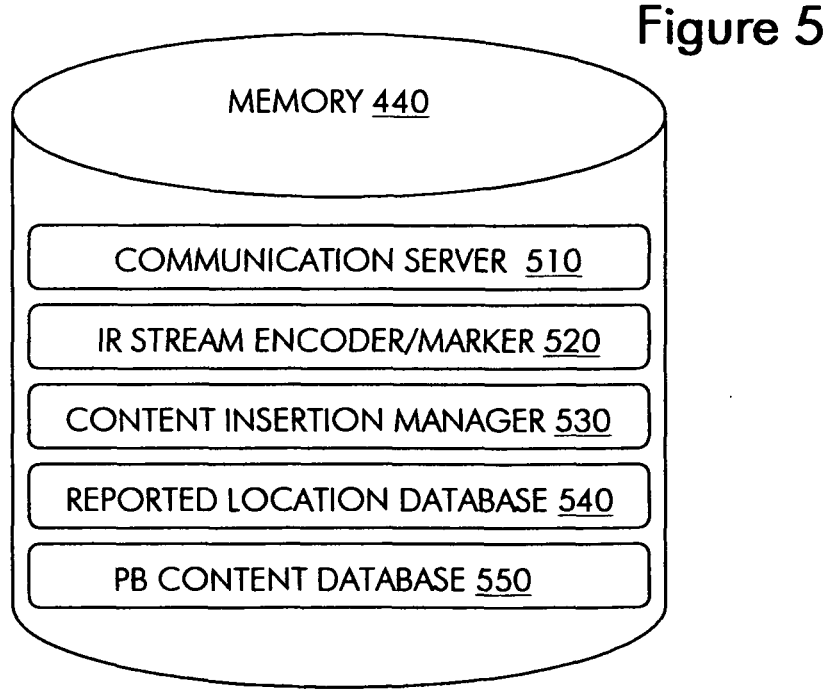
FIG. 5 shows operational elements of the Internet radio source of FIG. 4.

FIG. 5 shows operational elements of Internet radio source 120 stored in memory 440 to include a communication server 510, an Internet radio stream encoder/marker 520, a content insertion manager 530, a reported location database 540 and a program break content database 550. Communication server 510, Internet radio stream encoder/marker 520 and content insertion manager 530 are software programs executable by processor 430. Reported location database 540 and program break content database 550 are data storage elements. Internet radio source 120 and elements shown within memory 440 may be implemented on a single node or may be distributed across multiple nodes, which may be in close proximity or remote from one another. In one distributed architecture example, software elements 510, 520, 530 may be collocated with processor 430 on a first node while databases 540, 550 may be located on one or more other nodes to which the first node has network access. In another distributed architecture example, software elements 510, 520, 530 may be distributed across multiple nodes and executed by different processors.

Communication server 510 processes location reports received from mobile device 200 via communication interface 420. Communication server 510 may issue location requests via communication interface 420 in response to which location reports are received, or location reports may be received independent of any request issued by Internet radio source 120. Where employed, location requests may be transmitted in response to events or periodically. Communication server 510 extracts the location information, such as GPS coordinates, and the associated device ID, such as an IP address, from location reports and stores the associated information in reported location database 540. Any time stamp accompanying the location information may also be stored as part of the associated information. Communication server 510 also delivers to mobile device 200 via communication interface 420 an Internet radio stream having selected content retrieved from program break content database 550 inserted therein.

Internet radio stream encoder/marker 520 encodes and compresses sound received in an Internet radio program via audio interface 410 to convert the sound into an Internet radio stream for delivery over the Internet. Encoder/marker 520 also inserts markers into the Internet radio stream identifying starting points of program breaks in the Internet radio program during which program break content may be inserted into the Internet radio stream. Markers are electronically detectable by content insertion manager 530 to trigger content selection for insertion during program breaks. A marker may explicitly indicate the duration of a program break. Alternatively, content insertion manager 530 may determine the duration of a program break by reference to a program script provided in advance of the Internet radio program. For example, an advance program script may inform content insertion manager 530 that a marker detected about ten minutes after the start of an Internet radio program will precede a program break of one minute duration. In still other embodiments, content insertion manager 530 may discover the duration of a program break by detecting an end marker that signals the end of the program break.

Content insertion manager 530 applies information stored in reported location database 540 to select suitable audio and any related print content from program break content database 550 for insertion in an Internet radio stream during program breaks, and inserts selected content into the Internet radio stream. Program break content stored in database 550 comprises audio content, such as advertisements and news reports, that is distinct from the program content, and any related print content. In other embodiments, program break content may consist only of audio content or only print content. News reports may include, for example, traffic, weather, stock market, politics and sports reports. Related print content may include, for example, a printable coupon for a business entity (e.g. restaurant) that is sponsoring an audio advertisement. Program break content is stored in association with a location range and indication of program break duration for which such content is suitable for insertion.

Figure 6:
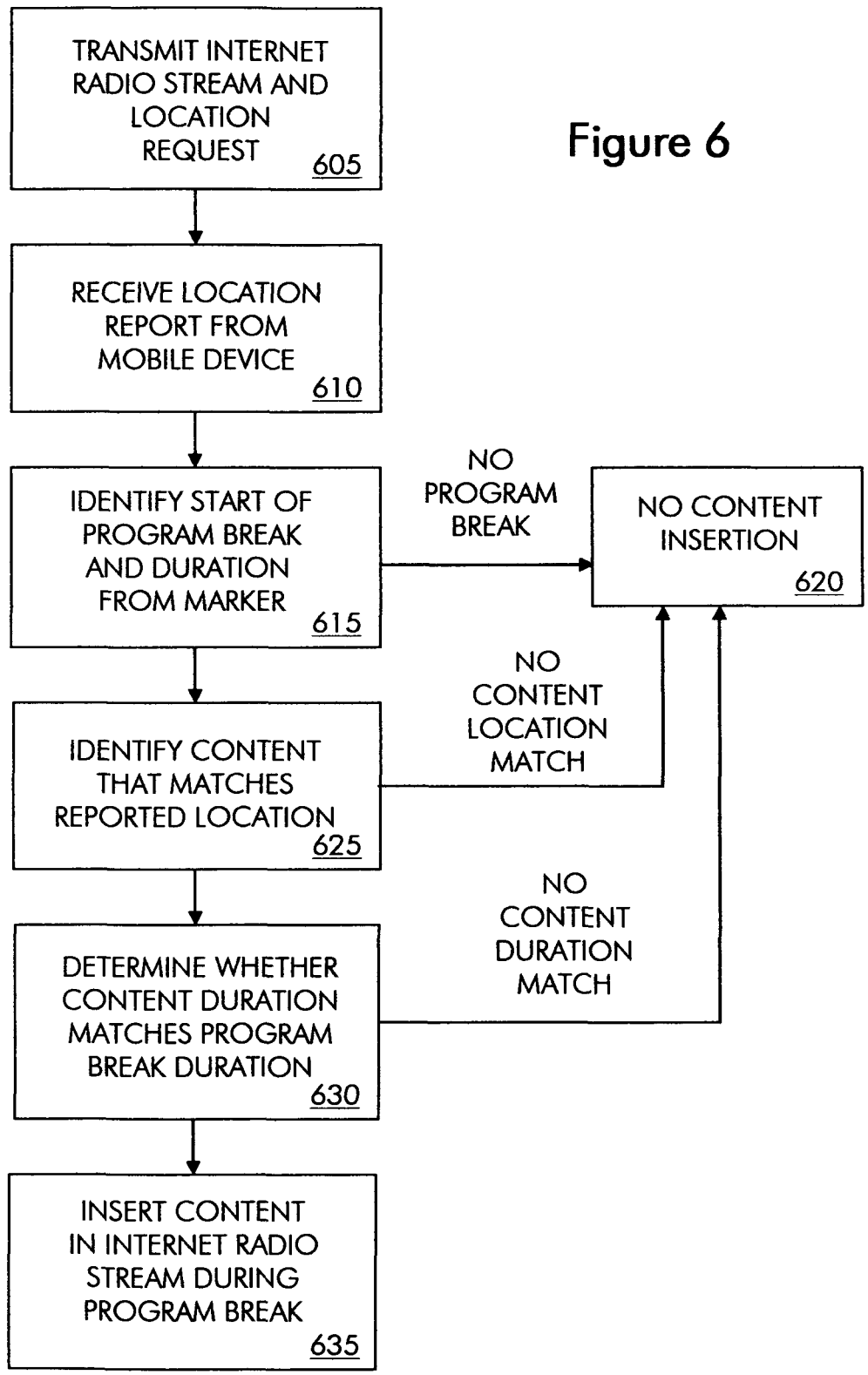
FIG. 6 shows method steps performed by an Internet radio source to facilitate location-based selection of content for outputting on a mobile device during a program break in an Internet radio stream in some embodiments of the invention.

FIG. 6 shows method steps performed by Internet radio source 120, under control of processor 430, to facilitate location-based selection of content for outputting on mobile device 200 during a program break in an Internet radio stream in some embodiments of the invention. It should be noted at the outset that while the method describes selection of program break content for a single mobile device 200, in practice there may be many mobile devices receiving the same Internet radio stream for which Internet radio source 120 simultaneously (or nearly simultaneously) selects program break content.

In the method, Internet radio source 120 transmits to mobile device 200 an Internet radio stream and a location request (605). The location request may be embedded with the Internet radio stream. In other embodiments, no location request is transmitted.

Next, Internet radio source 120 receives a location report from mobile device 200 (610). The location report has one or more instances of location information and an identifier associated with mobile device 200. The location information may be, for example, GPS coordinates including a latitude and longitude. The identifier of mobile device 200 may be, for example, an IP address, MAC address or session identifier. The location information may be time-stamped with a time that the location information was acquired by mobile device 200. The location information may be accurate to within GPS tolerances or within a lesser degree of accuracy prescribed by the user. Internet radio source 120 under control of processor 430 stores information from the location reports in reported location database 540.

Next, Internet radio source 120 under control of processor 430 identifies a program break in the Internet radio stream (615). In this regard, Internet radio source 120 detects a marker in the Internet radio stream that indicates a program break start and duration. In other embodiments, Internet radio source 120 may determine the duration of the program break from a program script. In other embodiments, Internet radio source 120 may discover the duration of the program break from an end marker. Naturally, if no marker is found, the content selection process is aborted (620).

If a program break is found, Internet radio source 120 under control of processor 430 next identifies any content in program break content database 550 that matches the most recent reported location of mobile device 200 in location database 540 (625). In this regard, Internet radio source 120 may compare for a match the most recent GPS coordinates of mobile device 200 with location ranges associated with various instances of program break content stored in database 550. If no instance of location-matching program break content is found, the content selection process is aborted (620). In that event, Internet radio source 120 may deliver during the program break predetermined default content.

It bears noting that Internet radio source 120 may inhibit the content selection process if the last reported location of mobile device 200 is not sufficiently current. To make this determination, Internet radio source 120 may compare time stamps stored in association with location information for mobile device 200 in reported location database 540 with the current time. For a mobile device that does not report time-stamped location information, Internet radio source 120 may inhibit the content selection process if such mobile device has failed to respond to the last N location requests, where N is a predetermined number that is at least one. Alternatively, Internet radio source 120 may itself associate time stamps with reported location information based on time of receipt and inhibit the content selection process if the time of the last reported location as indicated by a time stamp is sufficiently stale.

It also bears noting that Internet radio source 120 may inhibit selection of incompatible program break content. For example, if program break content has an audio component and a print component, Internet radio source 120 may inhibit selection of the program break content or may restrict selection to the audio component if Internet radio source 120 determines that the print component is incompatible with a mobile device, for example, determines that a mobile device does not have a printer. To make this determination, Internet radio source 120 may request a mobile device, or a mobile device may report independent of any request, information (e.g. device make and model) from which Internet radio source 120 can determine compatibility of the mobile device with program break content.

If one or more instances of location-matching program break content is found, Internet radio source 120 under control of processor 430 next determines whether the durations of the location-matching program break content instances match the duration of the program break (630). In this regard, Internet radio source 120 determines if the duration of the program break as indicated by the marker in the Internet radio stream or determined from a program script matches the duration of the one or more instances of location-matching program break content. If the duration of a given instance of location-matching program break content exceeds the duration of the program break, the program break content is not suitable for insertion during the program break and is not selected. This is because such program break content would be cut-off prior to completion if outputted during the program break. Moreover, if the duration of a given instance of location-matching program break content is substantially less than the duration of the program break, the program break content is not suitable for insertion during the program break and is not selected. This is because outputting of such program break content would finish well before completion of the program break, resulting in a substantial dead period in the Internet radio stream. However, if the duration of a given instance of location-matching program break content is identical or only slightly shorter than the duration of the program break, the program break content is suitable for insertion during the program break and may be selected. Moreover, if the duration of multiple instances of location-matching program break content when combined is identical or not substantially less than the duration of the program break, the sequence is suitable for insertion during the program break and may be selected as a sequence. If no instance of duration-matching program break content is found, the content selection process is aborted (620).

If one or more instances of duration-matching program break content is found, Internet radio source 120 under control of processor 430 inserts a selected instance of the duration-matching program break content into the Internet radio stream during the program break (635), and the program break content is delivered to mobile device 200 during the program break.

Naturally, if there are multiple program breaks, Steps 615-635 may be repeated for each program break.

In other embodiments, a start marker detected at the start of a program break prompts selection and insertion of program break content and an end marker detected at the end of the program break signals resumption of the program content. In these embodiments, the program break duration may not be known when program break content is selected and program break content that does not match the program break duration may thus be selected. Internet radio source 120 may make timing adjustments to the Internet radio stream transmitted by Internet radio source 120 (e.g. delay resumption of transmission of the regular program content) to achieve seamless streaming in these embodiments.

Figure 7:
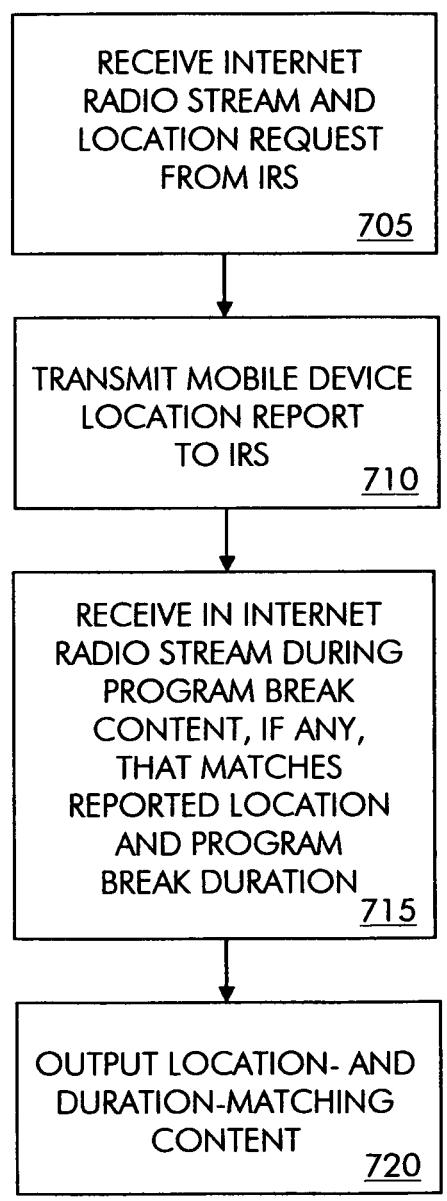
FIG. 7 shows method steps performed on a mobile device to facilitate location-based selection of content for outputting on the mobile device during a program break in an Internet radio stream in some embodiments of the invention.

FIG. 7 shows method steps performed on mobile device 200, under control of processor 230, to facilitate location-based selection of content for outputting on mobile device 200 during a program break in an Internet radio stream in some embodiments of the invention. Mobile device 200 receives from Internet radio source 120 an Internet radio stream and a location request (705). In other embodiments, no location request is transmitted. Mobile device 200 transmits to Internet radio source 120 a location report (710). Mobile device 200 then receives during a program break in the Internet radio stream program break content, if any, that matches the location reported by mobile device 200 and the program break duration (715) and outputs the location- and duration-matching content (720).

Figure 8:
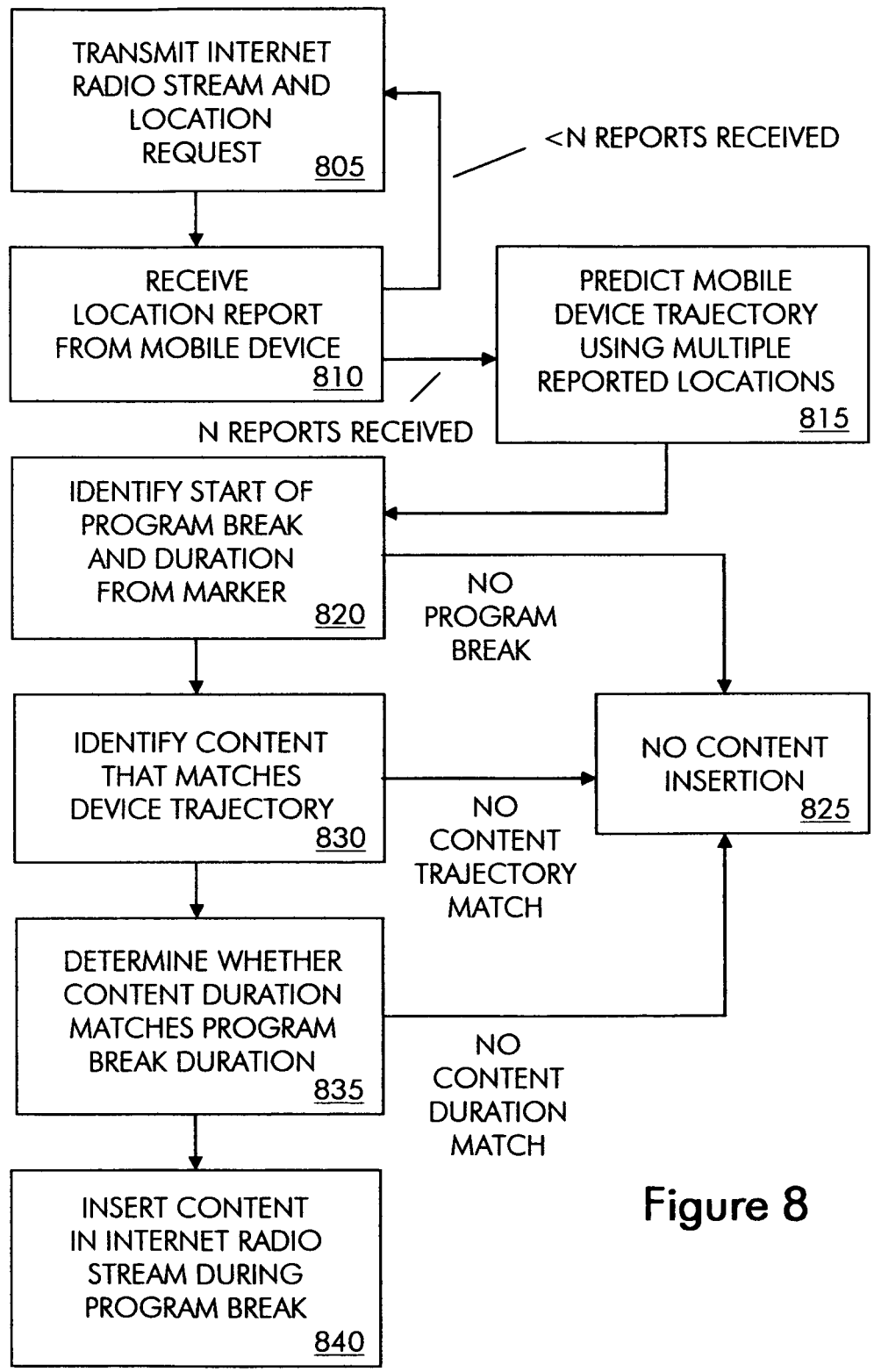
FIG. 8 shows method steps performed by an Internet radio source to facilitate trajectory-based selection of content for outputting on a mobile device during a program break in an Internet radio stream in other embodiments of the invention.

FIG. 8 shows method steps performed by Internet radio source 120 to facilitate trajectory-based selection of content for outputting on mobile device 200 during a program break in an Internet radio stream in other embodiments of the invention. These embodiments take into account the directional bearing and velocity of mobile device 200 in selecting program break content. This enables program break content to be selected that addresses topics relating to where a mobile device user is likely headed, which may be of greater value to the sponsor of the information and the listener alike. For example, trajectory information for mobile device 200 can be advantageously applied to select for outputting on mobile device 200 an advertisement for a roadside location that a user traveling on a roadway is approaching but has not yet reached or passed, affording the user ample time to consider, decide and act on the advertisement.

In the method, Internet radio source 120 transmits to mobile device 200 an Internet radio stream and location request (805) and receives a location report from mobile device 200 (810). In other embodiments, no location request is transmitted. If a threshold number N of location reports, where N is greater than one, has not been received from mobile device 200, the content selection process returns to Step 805. However, if N location reports have been received from mobile device 200, the content selection process proceeds to Step 815.

Once N location reports have been received, Internet radio source 120 under control of processor 430 determines a trajectory of mobile device 200 using the multiple reported locations (815). In this regard, Internet radio source 120 may determine a directional bearing and a velocity of mobile device 200 using GPS coordinates and associated time stamps from multiple location reports and predict future locations of mobile device 200 over time based on the bearing and velocity. Internet radio source 120 may also consult a GPS map database stored in memory 440 or elsewhere to identify a road upon which mobile device 200 is traveling and predict future locations of mobile device 200 over time based on the roadway, bearing and velocity. In any event, Internet radio source 120 determines a trajectory of mobile device 200 from which future locations of mobile device 200 at future times can be predicted. Naturally, the trajectory is updated as additional location reports are received from mobile device 200.

Next, Internet radio source 120 under control of processor 430 detects a marker in the Internet radio stream that indicates a program break start and duration (820). If no marker is found, the content selection process is aborted (825).

If a program break is found, Internet radio source 120 under control of processor 430 next identifies any content in program break content database 550 that matches the trajectory of mobile device 200 (830). In this regard, Internet radio source 120 may compare for a match the trajectory of mobile device 200 with locations or location ranges associated with various instances of program break content stored in database 550. In some embodiments, content insertion manager 530 determines an estimated time of arrival of mobile device 200 at a location or within a location range associated with an instance of program break content stored on database 550 using the present trajectory of mobile device 200 and declares a match if the estimated time of arrival is within a particular time window. For example, content insertion manager 530 may implement a rule whereby a trajectory match is declared for program break content if an estimated time of arrival of mobile device 200 at a location associated with the program break content is between one and ten minutes. If no instance of trajectory-matching program break content is found, the content selection process is aborted (825).

If one or more instances of trajectory-matching program break content is found, Internet radio source 120 under control of processor 430 next determines whether the durations of the trajectory-matching program break content instances match the duration of the program break (835). If no instance of duration-matching program break content is found, the content selection process is aborted (830).

If one or more instances of duration-matching program break content is found, Internet radio source 120 under control of processor 430 inserts the duration-matching program break content into the Internet radio stream during the program break (840), and the program break content is delivered to mobile device 200 during the program break.

It will be appreciated by those of ordinary skill in the art that the invention can be embodied in other specific forms without departing from the spirit or essential character hereof. For example, while in the described methods the content-location match step (FIG. 6) and content-trajectory match step (FIG. 8) are performed before the content-duration match step, these steps may be performed in reverse order or contemporaneously. Moreover, in some embodiments, the mobile device selects program break content using location information generated on the mobile device. In these embodiments, the mobile device does not transmit location information to the Internet radio source. Instead, the Internet radio source identifies program break content candidates whose durations are suitable for upcoming program breaks and downloads the program break content candidates to the mobile device. The mobile device receives from the Internet radio source the plurality of program break content candidates and their associated location ranges and selects content from among the content candidates based at least in part on a match between location information resolved by the mobile device, or a trajectory determined by the mobile device from multiple instances of location information resolved by the mobile device, and the location range of the content candidate. The mobile device then outputs the selected content during the program break.

The present description is therefore considered in all respects to be illustrative and not restrictive. The scope of the invention is indicated by the appended claims, and all changes that come with in the meaning and range of equivalents thereof are intended to be embraced therein.

What is claimed is:

1. A method for streaming localized content to a mobile device during a program break in an Internet radio program, comprising the steps of:
    streaming from an Internet radio source to a mobile device an Internet radio program;
    receiving by the Internet radio source from the mobile device a report including a location of the mobile device;
    detecting electronically by the Internet radio source a start marker in the Internet radio program indicating a start of a program break;
    identifying by the Internet radio source an explicit indicator of duration of the program break using the start marker;
    selecting by the Internet radio source program break content using the reported location of the mobile device and the explicitly indicated duration of the program break;
    streaming from the Internet radio source to the mobile device the program break content during the program break; and
    resuming by the Internet radio source streaming to the mobile device of the Internet radio program after the program break.

2. The method of claim 1, wherein the start marker includes the explicit indicator of duration.

3. The method of claim 1, wherein the identifying step comprises identifying the explicit indicator of duration using an advance program script that contains associations between program break start times and explicit indicators of durations of program breaks.

4. The method of claim 1, wherein the selecting step comprises identifying the program break content based in part on a match between the explicitly indicated duration and a duration of the program break content.

5. The method of claim 1, wherein the reported location includes global positioning system (GPS) coordinates.

6. The method of claim 1, wherein the mobile device is a wireless handset.

7. The method of claim 1, wherein the program break content comprises an advertisement.

8. The method of claim 1, wherein the program break content comprises a radio station identification message.

9. The method of claim 1, wherein the program break content comprises a traffic report.

10. The method of claim 1, wherein the program break content comprises a weather report.

11. The method of claim 1, wherein the program break content comprises a politics report.

12. The method of claim 1, wherein the program break content comprises a sports report.

13. The method of claim 1, wherein the reported location has a degree of accuracy selected by a user of the mobile device.

14. The method of claim 1, wherein the report further includes a time and the method further comprises verifying by the Internet radio source using the reported time that the reported location is sufficiently current to be used in selecting the program break content.

15. An Internet radio source, comprising:
    at least one communication interface; and
    a processor communicatively coupled with the communication interface, wherein the processor is configured to stream to a mobile device via the interface an Internet radio program, receive from the mobile device via the interface a report including a location of the mobile device, detect electronically a start marker in the Internet radio program indicating a start of a program break, identify an explicit indicator of duration of the program break using the start marker, select program break content using the reported location of the mobile device and the explicitly indicated duration of the program break, stream to the mobile device the program break content during the program break and resume streaming to the mobile device of the Internet radio program after the program break.

16. The Internet radio source of claim 15, wherein the start marker includes the explicit indicator of duration.

17. The Internet radio source of claim 15, wherein the processor is configured to identify the explicit indicator of duration using an advance program script that contains associations between program break start times and explicit indicators of durations of program breaks.

18. The Internet radio source of claim 15, wherein the processor is configured to identify the program break content based in part on a match between the explicitly indicated duration and a duration of the program break content.

19. The Internet radio source of claim 15, wherein the reported location includes global positioning system (GPS) coordinates.

20. The Internet radio source of claim 15, wherein the mobile device is a wireless handset.

21. The Internet radio source of claim 15, wherein the program break content comprises an advertisement.

22. The Internet radio source of claim 15, wherein the program break content comprises a radio station identification message.

23. The Internet radio source of claim 15, wherein the program break content comprises a traffic report.

24. The Internet radio source of claim 15, wherein the program break content comprises a weather report.

25. The Internet radio source of claim 15, wherein the program break content comprises a politics report.

26. The Internet radio source of claim 15, wherein the program break content comprises a sports report.

27. The Internet radio source of claim 15, wherein the reported location has a degree of accuracy selected by a user of the mobile device.

28. The Internet radio source of claim 15, wherein the report further includes a time and the processor is further configured to verify using the reported time that the reported location is sufficiently current to be used in selecting the program break content.

\* \* \* \* \*

UNITED STATES PATENT AND TRADEMARK OFFICE
CERTIFICATE OF CORRECTION

PATENT NO. : 8,452,227 B2  
APPLICATION NO. : 12/384193  
DATED : May 28, 2013  
INVENTOR(S) : David D. Minter et al.

Page 1 of 1

It is certified that error appears in the above-identified patent and that said Letters Patent is hereby corrected as shown below:

In the Specifications:

Column 5, line 2, "posses" is replaced with --passes--.

Signed and Sealed this  
Twenty-third Day of July, 2013

Teresa Stanek Rea  
*Acting Director of the United States Patent and Trademark Office*